United States Patent
Gopalakrishnan et al.

(10) Patent No.: US 9,465,625 B2
(45) Date of Patent: Oct. 11, 2016

(54) PROVISIONING OF OPERATING ENVIRONMENTS ON A SERVER IN A NETWORKED ENVIRONMENT

(75) Inventors: U Gopalakrishnan, Bangalore (IN); William P. Horn, Scarsdale, NY (US); Ajay Mohindra, Yorktown Heights, NY (US); Shailabh Nagar, Bangalore (IN); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/463,647

(22) Filed: May 3, 2012

(65) Prior Publication Data
US 2012/0221842 A1  Aug. 30, 2012

Related U.S. Application Data

(62) Division of application No. 12/565,291, filed on Sep. 23, 2009, now Pat. No. 8,332,496.

(51) Int. Cl.
G06F 15/177 (2006.01)
G06F 9/00 (2006.01)
G06F 9/44 (2006.01)

(52) U.S. Cl.
CPC .................. *G06F 9/4416* (2013.01)

(58) Field of Classification Search
CPC ....... G06F 9/4416; G06F 9/00; G06F 15/177
USPC ..................... 709/222, 221; 713/1
See application file for complete search history.

(56) References Cited

U.S. PATENT DOCUMENTS

| | | | |
|---|---|---|---|
| 6,574,618 B2 | 6/2003 | Eylon et al. | |
| 6,718,464 B2 | 4/2004 | Cromer et al. | |
| 6,763,457 B1 | 7/2004 | Aguilar et al. | |
| 7,013,462 B2 | 3/2006 | Zara et al. | |
| 7,120,785 B1 | 10/2006 | Bowers et al. | |
| 7,127,597 B2 | 10/2006 | Backman et al. | |
| 7,237,238 B2 | 6/2007 | Peppers et al. | |
| 7,580,991 B2 | 8/2009 | Scheer et al. | |
| 7,779,469 B2 * | 8/2010 | Hopen ................ G06F 21/6218 709/220 |
| 7,802,084 B2 | 9/2010 | Fitzgerald et al. | |

(Continued)

FOREIGN PATENT DOCUMENTS

| | | |
|---|---|---|
| EP | 1848113 A2 | 10/2007 |
| WO | 2009153387 A1 | 12/2009 |
| WO | 2010008706 A1 | 1/2010 |

OTHER PUBLICATIONS

"Multi-User System Environment," IBM Technical Disclosure Bulletin, 40(9):21-22, Sep. 9, 1997.

(Continued)

*Primary Examiner* — Kostas Katsikis
(74) *Attorney, Agent, or Firm* — Yee & Associates, P.C.; Mercedes Hobson

(57) ABSTRACT

A computer deploys an operating environment onto a provisionable server. The computer assigns an operating environment from an operating environment configuration management database to the provisionable server in response to detecting a provisioning event. The computer stores a record of the assignment in a deployment configuration management database and updates a management server with a designated operating environment identifier of the assignment.

20 Claims, 6 Drawing Sheets

(56) References Cited

U.S. PATENT DOCUMENTS

| | | | |
|---|---|---|---|
| 7,849,169 B2* | 12/2010 | Haun | G06F 9/00 707/638 |
| 8,332,496 B2 | 12/2012 | Gopalakrishnan et al. | |
| 2001/0034736 A1 | 10/2001 | Eylon et al. | |
| 2002/0156894 A1* | 10/2002 | Suorsa et al. | 709/226 |
| 2003/0131078 A1 | 7/2003 | Scheer et al. | |
| 2003/0167354 A1 | 9/2003 | Peppers et al. | |
| 2004/0081104 A1 | 4/2004 | Pan et al. | |
| 2007/0300054 A1 | 12/2007 | Lo et al. | |
| 2008/0046708 A1* | 2/2008 | Fitzgerald et al. | 713/2 |
| 2009/0222896 A1* | 9/2009 | Ichikawa et al. | 726/6 |
| 2009/0276620 A1* | 11/2009 | McCarron | H04L 9/3271 713/155 |
| 2009/0276715 A1 | 11/2009 | Arbogast et al. | |
| 2010/0107238 A1* | 4/2010 | Stedman | G06F 21/32 726/13 |
| 2010/0306521 A1 | 12/2010 | El Zur et al. | |
| 2010/0325410 A1 | 12/2010 | Fitzgerald et al. | |
| 2011/0060947 A1* | 3/2011 | Song | G06F 21/53 714/37 |
| 2011/0072255 A1 | 3/2011 | Gopalakrishnan et al. | |

OTHER PUBLICATIONS

USPTO Office Action dated Feb. 16, 2012, regarding U.S. Appl. No. 12/565,291, 43 pages.
Response to Office Action, dated May 3, 2012, regarding U.S. Appl. No. 12/565,291, 30 pages.
Notice of Allowance regarding U.S. Appl. No. 12/565,291, dated Aug. 2, 2012, 18 pages.
Supplemental Notice of Allowance regarding U.S. Appl. No. 12/565,291, dated Aug. 27, 2012, 16 pages.

* cited by examiner

PROVISIONING OF OPERATING ENVIRONMENTS ON A SERVER IN A NETWORKED ENVIRONMENT

PRIORITY INFORMATION

This application is a divisional of application Ser. No. 12/565,291, entitled "PROVISIONING OF OPERATING ENVIRONMENTS ON A SERVER IN A NETWORKED ENVIRONMENT", filed Sep. 23, 2009, status: Allowed.

BACKGROUND OF THE INVENTION

1. Field of the Invention

The disclosure is related generally to a data processing system and in particular to a method and apparatus for provisioning software systems. More specifically, the present invention is directed to a computer implemented method, apparatus, and computer usable program code for provisioning software in a multi-tenant environment.

2. Description of the Related Art

Corporate data centers typically include a set of distributed servers interconnected by a network. A typical data center is a facility that houses computer systems and associated components, such as telecommunications and storage systems. The data center generally includes redundant or backup power supplies, redundant data communications connections, environmental controls, and special security devices.

A central purpose of a data center is running software applications that handle the core business and operational data of one or more tenants. A tenant may be a department within a company, or one of a group of companies that contract for the data center's server resources. The software applications may be proprietary and developed internally by an organization, or bought from enterprise software vendors. The software applications may include, for example, databases, file servers, application servers, middleware, and various others.

To reduce costs, data centers are increasingly concerned with improving the utilization of server resources. One technique for increasing utilization involves the re-assignment (and subsequent re-provisioning) of servers from one application or tenant experiencing a low demand to another application or tenant experiencing a high demand.

The Information Technology Infrastructure Library (ITIL) is a widely followed set of concepts and best practices for managing data centers. In ITIL, the configuration management database (CMDB) represents the conceptual repository of information related to the components of a data center. Following ITIL best practices, the process of provisioning involves inserting and updating entries stored in the CMDB. For example, servers, software, and the relationships between a particular server and the particular software provisioned on that server are all stored in the CMDB.

Provisioning a solution in a data center usually requires the installation and configuration of operating system and other software onto a server. Provisioning a server can be expedited by using automation tools. Examples of tools include IBM® Director Remote Deployment Manager (IDRDM), IBM® TIVOLI PROVISIONING MANAGER™ (ITPM), HP® OPENVIEW OS MANAGER USING RADIA™ (HPOV), and ACRONIS SNAP DEPLOY™ (ASD). IDRDM and ITPM are offered by INTERNATIONAL BUSINESS MACHINES CORP.®. HPOV™ is offered by HEWLETT PACKARD CO.®, and ASD is offered by ACRONIS, INC.®.

Several existing provisioning techniques (IDRDM, HPOV, and ASD) use a "push" approach to replicate a disk image containing the desired software system from a repository onto the target system. Other systems (ITPM) use software to externally automate the provisioning of software components once a base operating system has been installed.

The provisioning of a software system in a networked environment is a process that involves an initial step of booting a target system over the network instead of booting from directly attached storage. In this scenario, the network-booted operating system of the target system is then used to perform the unattended installation of the operating system and software components chosen for the target system. Prior works related to the unattended installation of an operating system over a network include IBM AIX® and SUN SOLARIS®. These systems utilize the Pre-boot Execution Environment (PXE) as defined by INTEL'S® Wired For Management specification. The PXE technology provides a computer with the ability to load and execute a network bootstrap program from a server on the network prior to or as an alternative to booting the operating system from directly attached storage.

BRIEF SUMMARY OF THE INVENTION

According to an illustrative embodiment of the present invention, a computer deploys an operating environment onto a provisionable server. The computer assigns an operating environment from an operating environment configuration management database to the provisionable server in response to detecting a provisioning event. The computer stores a record of the assignment in a deployment configuration management database and updates a management server with a designated operating environment identifier of the assignment.

DETAILED DESCRIPTION OF THE INVENTION

Figure 1:
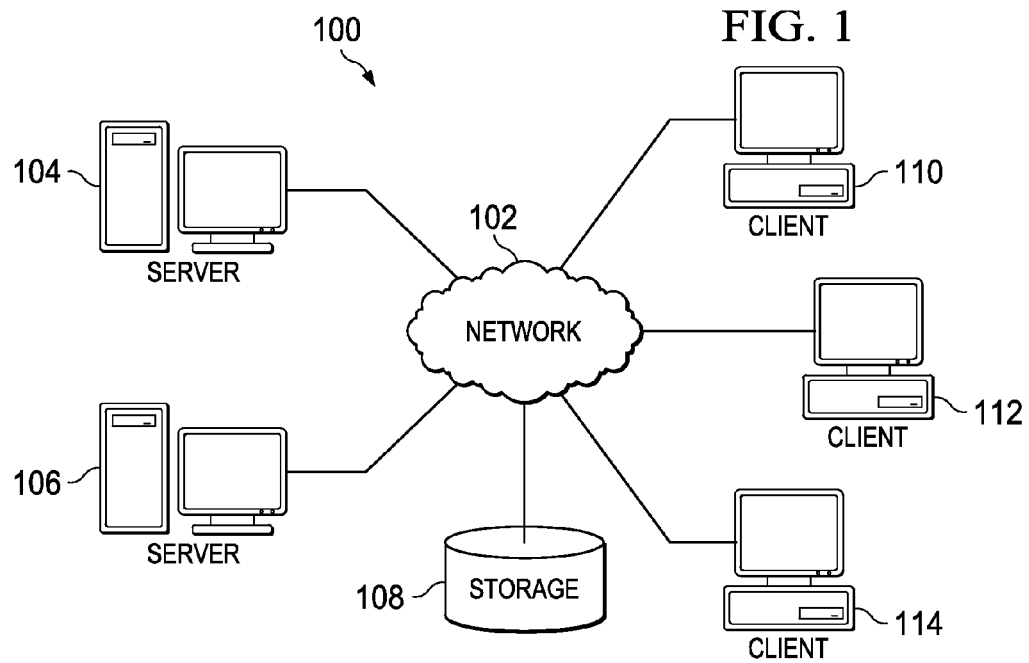
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
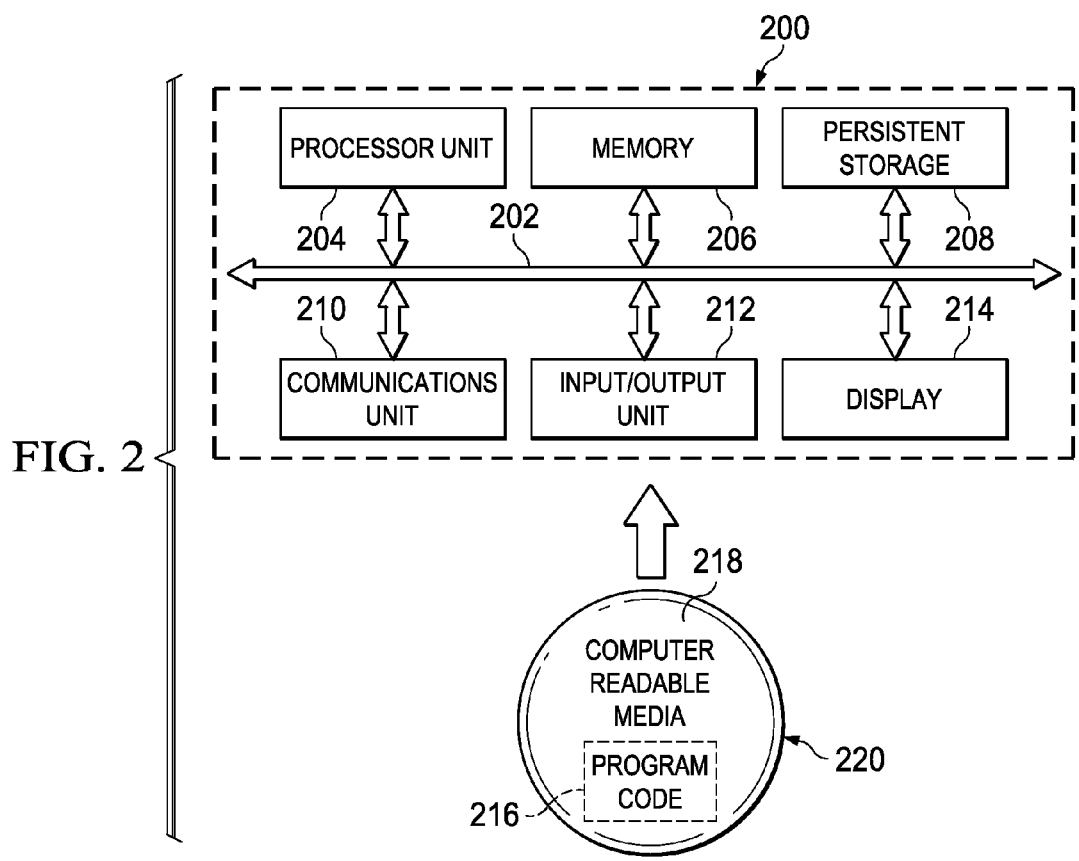
FIG. 2 is a block diagram of a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. In an illustrative example, a server, such as server 104, may be identified for automated provisioning and re-provisioning. When server 104 is powered on, server 104 boots off the network and identifies itself to a management server, such as server 106. Server 106 may use a signature of server 104 to locate a designated operating environment for server 104. Server 104 may continue to boot from an operating environment stored on a local storage device, or may boot from a different operating environment stored in a remote storage device.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of processors. As used herein, the term "set" may refer to one or more. Thus, a set of processors may be one or more processors. In addition, processor unit 204 may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. Communications unit 210 may be a network interface card. In these examples, however, communications unit 210 is a pre-boot execution environment (PXE) network adapter. A pre-boot execution environment network adapter is a component of the Wired for Management (WfM), open-industry specification developed by Intel to enable information technology professionals to automate client-PC management over a network. The Wired for Management specification allows a workstation to boot from a server on a network prior to booting the operating system on the local hard drive. A PXE-enabled workstation connects its network interface card to the local area network via a jumper, which keeps the workstation connected to the network in the absence of power. Because a network administrator does not have to physically visit the specific workstation and manually boot it, operating systems and other software, such as diagnostic programs, can be loaded onto the device from a server over the network. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer-recordable storage media. In some instances, computer-recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communication links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

An operating environment is the set of software applications selected for use on a single server. The software applications selected for inclusion in an operating environment are chosen, in part, for satisfying the specific needs of one or more tenants served by a provisionable server on which operating environments are hosted. The set of software applications includes, for example, an operating system, middleware, and software applications selected by the one or more tenants. To differentiate one operating environment from another, each operating environment is assigned a unique name. In many instances, the name will reflect the type of the operating environment and a version of the operating environment. The version represents the different versions of the set of software applications that form the operating environment.

The provisioning of servers in a network is a process by which a set of servers are identified and loaded with an operating environment for use by one or more tenants. The illustrative embodiments disclosed herein recognize the limitations of currently used provisioning methods that lack mechanisms for enabling self-configuration of operating environments, and for self-scrubbing procedures that facilitates the accommodation of multiple tenants. These illustrative embodiments enable configuration of tenant-specific operating environments in a quicker, more robust, automated approach for provisioning servers. Consequently, the methods described herein are capable of provisioning and re-provisioning of servers in data centers that support multiple tenants and multiple applications in such a way that the provisioning and re-provisioning occur quickly, without errors, and with a minimum amount of user-input.

Therefore, the illustrative embodiments provide a computer implemented method, apparatus, and computer program product for provisioning a server on a network. In one embodiment, the process sends a server identifier to a management server in response to receiving a boot command. The management server uses the server identifier for identifying a designated operating environment for the server to form a designated operating environment identifier. The process then receives, from the management server, the designated operating environment identifier and a first bootstrap code. The process uses the first bootstrap code to extract information for identifying a local operating environment on the server. Thereafter, the process compares the local operating environment to the designated operating environment and initiates a final boot sequence of the server based on the comparison of the local operating environment and the designated operating environment.

Figure 3:
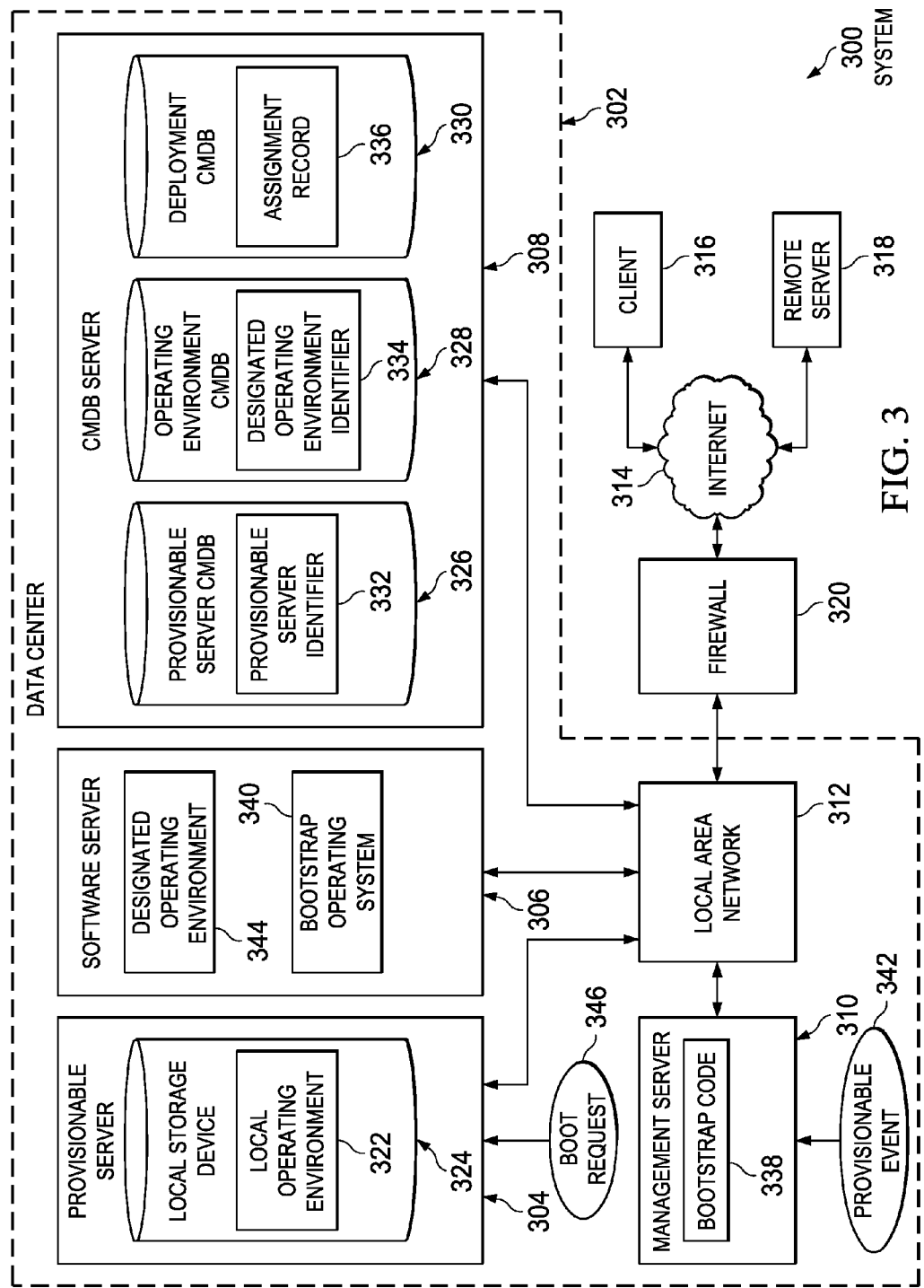
FIG. 3 is a block diagram of a system for provisioning software in a multi-tenant environment in accordance with an illustrative embodiment.

FIG. 3 is a block diagram of a system for provisioning software in a multi-tenant environment. System 300 is a data processing system, such as network data processing system 100 in FIG. 1. System 300 includes data center 302. Data center 302 is a facility that houses computing devices, software applications, and communications equipment for processing the data of one or more tenants. Data center 302 includes provisionable server 304, software server 306, configuration management database server (CMDB) 308, and management server 310. Provisionable server 304, software server 306, configuration management database server 308, and management server 310 are servers, such as servers 104 and 106 in FIG. 1. Although the servers of data center 302 are depicted as separate severs in this illustrative example in FIG. 3, in another embodiment, the functionality of two or more servers may be implemented in a single server.

Data is transmitted among the servers of data center 302 via local area network 312. Local area network 312 is an infrastructure that permits communication of servers in data center 302. Local area network 312 may be a component of a network such as network 102 in FIG. 1. The servers connected to local area network 312 may connect to Internet 314 for communicating with client 316 and remote server 318. Client 316 is a client such as client 110 in FIG. 1. Remote server 318 is a server, such as server 104 in FIG. 1. Client 316 and/or remote server 318 may be tenants requiring data processing services from provisionable server 304. Access to local area network 312 by client 316 and remote server 318 is controlled by firewall 320. Firewall 320 is a system that secures the computing devices of data center 302 from unauthorized access by computing devices connected to Internet 314.

Provisionable server 304 is a set of one or more servers configured for hosting operating environments. An operating environment is a set of software components selected to satisfy the processing requirements of one or more tenants. The operating environment includes an operating system, middleware, and one or more software applications. In this illustrative example, provisionable server 304 is hosting local operating environment 322. Local operating environment 322 is an operating environment stored in local storage device 324 for execution on provisionable server 304. Local storage device 324 is a device for storing data. Local storage device 324 may be, for example, a random access memory, a flash memory, a hard drive, a network accessible storage device, or a storage device on a storage area network.

Local operating environment 322 may be downloaded to local storage device 324 from software server 306. Software server 306 is a set of one or more servers that stores software necessary for provisioning operating environments on provisionable server 304. In one embodiment, local operating environment 322 may be downloaded from software server 306 to provisionable server 304 using a file restore mechanism. The file restore mechanism may be, for example, an rsync application. Rsync is free software released under the GNU General Public License. In another embodiment, local operating environment 322 is downloaded from software server 306 to provisionable server 304 using a copy operation. In yet another embodiment, local operating environment 322 may be downloaded to provisionable server 304 from software server 306 using a file transfer protocol (FTP).

Configuration management database server 308 is a set of one or more servers that maintains a set of configuration management databases (CMDBs) used in the provisioning of operating environments onto provisionable server 304. In this illustrative example in FIG. 3, configuration management database server 308 includes provisionable server configuration management database 326, operating environment configuration management database 328, and deployment configuration management database 330. Provisionable server configuration management database 326, operating environment configuration management database 328, and deployment configuration management database 330 are repositories storing data and other information related to the components of system 300.

Configuration management database server 308 includes provisionable server configuration management database 326. Provisionable server configuration management database 326 is a database that stores data for managing provisionable server 304. The data stored in provisionable server configuration management database 326 includes, without limitation, provisionable server identifier 332. Provisionable server identifier 332 is a set of one or more identifiers that identifies each provisionable server of provisionable server 304. In the event that provisionable server 304 includes two or more provisionable servers, provisionable server identifier 332 includes one provisionable server identifier for each provisionable server of provisionable server 304. Provisionable server identifier is used for identifying each of the provisionable servers from provisionable server 304. In one embodiment, provisionable server identifier 332 is a media access control (MAC) address of a provisionable server. Provisionable server identifier 332 is added to provisionable server configuration management database 326 when provisionable server 304 is added to data center 302.

Configuration management database server 308 also includes operating environment configuration management database 328. Operating environment configuration management database 328 is a database for managing the allocation of operating environments. In particular, operating environment configuration management database 328 includes designated operating environment identifier 334. Designated operating environment identifier 334 is an identifier that identifies a unique operating environment and discloses a location of the operating environment in software server 306. Designated operating environment identifier 334 may be used for locating operating environments for provisioning into provisionable server 304.

Configuration management database server 308 also includes deployment configuration management database 330. Deployment configuration management database 330 is a database for managing an assignment of operating environments. In particular, deployment configuration management database 330 stores assignment record 336. Assignment record 336 is a record, storing information relating to the assignment of an operating environment from software server 306 to a provisionable server such as provisionable server 304.

In addition, data center 302 includes management server 310. In one embodiment, management server 310 is a server implementing PXE technology in accordance with the wired for management (WfM) open-industry specification. The wired for management open-industry specification enables automation of computer management over a network. Management server 310 initiates a process for provisioning and/or reprovisioning provisionable server 304. In addition, management server 310 governs the deployment of operating environments onto provisionable servers.

Management server 310 includes bootstrap code 338. Bootstrap code 338 is computer code usable by a provisionable server to initiate the provisioning of an operating environment onto the provisionable server. For example, management server 310 provides bootstrap code 338 to provisionable server 304 in response to receiving, from provisionable server 304, a request for bootstrap code 338. The request may include a provisionable server identifier such as provisionable server identifier 332. Provisionable server 304 may then use bootstrap code 338 for booting bootstrap operating system 340 from software server 306. Bootstrap operating system 340 is a software program for initializing an operating environment of provisionable server 304.

Management server 310 also controls the deployment of operating environments in provisionable server 304. Management server 310 initiates a deployment process in response to detecting provisionable event 342. Provisionable event 342 is an event that triggers the deployment process governed by management server 310. In an illustrative embodiment, provisionable event 342 is at least one of a registration of a new operating environment, an addition of a provisionable server to a data center, and a request for reassigning the provisionable server. As used herein the phrase "at least one of" when used with a list of items means that different combinations of one or more of the items may be used and only one of each item in the list may be needed. For example, "at least one of item A, item B, and item C" may include, for example, without limitation, item A or item A and item B. This example also may include item A, item B, and item C or item B and item C. In other words, provisionable event 342 may be either a registration of a new operating environment, an addition of a provisionable server to a data center, a request for reassigning the provisionable server, or any combination thereof.

The registration of the new operating environment entails creating and storing a new operating environment identifier into operating environment configuration management database 328. In addition, the registration of the new operating environment involves storing the software components of the new operating environment in software server 306. Thus, in an illustrative embodiment where provisionable event 342 is the registration of designated operating environment 344, management server 310 may detect provisionable event 342 by detecting the storage of designated operating environment identifier 334 in operating environment configuration management database 328, or the storage of designated operating environment 344 in software server 306.

The introduction of a new provisionable server into data center 302 involves the registration of a provisionable server identifier in provisionable server configuration management database 326 for the new provisionable server. Thus, in one non-limiting embodiment, where provisionable event 342 is the introduction of a new provisionable server to data center 302, management server 310 may detect provisionable event 342 by detecting the registration of provisionable server identifier 332 in provisionable server configuration management database 326.

Provisionable event 342 may also be reassignment of a provisionable server. For example, provisionable server 304 may be assigned to a new tenant because an existing tenant no longer requires data processing servers of data center 302. Alternatively, an existing tenant of data center 302 may require additional processing capability and provisionable server 304 may be assigned to the existing tenant for satisfying the additional processing requirements. In this example, provisionable event 342 may be a request from a data center administrator reassigning provisionable server 304. Thus, when management server 310 detects provisionable event 342, management server may initiate the process for re-provisioning provisionable server 304.

In response to detecting provisionable event 342, management server 310 assigns designated operating environment identifier 334 to provisionable server 304 from operating environment configuration management database 328. This assignment of designated operating environment 344 may be made by a data center administrator or automatically by software. In either event, details of the assignment are embodied in assignment record 336 and stored in deployment configuration management database 330.

After assignment record 336 is stored in deployment configuration management database 330, management server 310 generates bootstrap code 338. Bootstrap code 338 may then be used by provisionable server 304 for initiating a provisioning process. The provisioning process begins in response to receiving boot request 346. In an illustrative example, boot request 346 is a request to power up.

In response to receiving boot request 346, provisionable server 304 requests bootstrap code 338 from management server 310. In one embodiment, the request includes provisionable server identifier 332. Thus, management server 310 may identify the provisionable server from which the request was sent. In addition, management server 310 may return to the requesting provisionable server a corresponding bootstrap code. In this illustrative embodiment, when management server 310 receives a request from provisionable server 304, management server 310 returns bootstrap code 338.

Provisionable server 304 uses bootstrap code 338 to boot bootstrap operating system 340. Using bootstrap operating system 340, provisionable server 304 identifies local operating environment 322 stored in local storage device 324. Provisionable server 304 then compares local operating environment 322 with a designated operating environment identified in bootstrap code 338. If local operating environment 322 is different than the designated operating environment identified by bootstrap code 338, or if information regarding local operating environment cannot be obtained or is unavailable, then provisionable server 304 formats local storage device 324.

Provisionable server 304 downloads designated operating environment 344 to local storage device 324 from software server 306. Provisionable server 304 then stores a copy of designated operating environment identifier 334 in local storage device 324. Subsequently, provisionable server 304 boots the local operating environment 322 stored in local storage device 324. Provisionable server 304 then reboots and configures designated operating environment 344 using a run-once script.

If provisionable server 304 determines local operating environment 322 matches the designated operating environment for provisionable server 304, then provisionable server 304, using the bootstrap operating system, boots using local operating environment 322.

Figure 4:
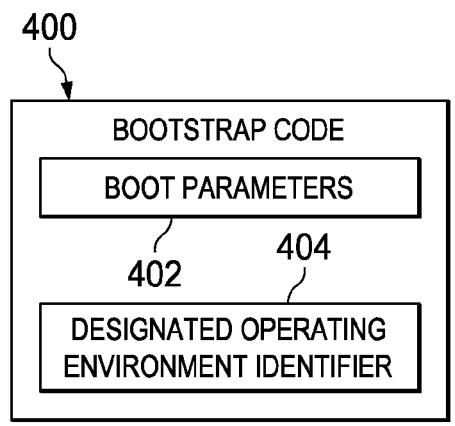
FIG. 4 is a block diagram of bootstrap code in accordance with an illustrative embodiment.

FIG. 4 is a block diagram of bootstrap code in accordance with an illustrative embodiment. Bootstrap code 400 is bootstrap code such as bootstrap code 338 in FIG. 3.

Bootstrap code 400 is computer usable code for initiating the provisioning operating environments onto a provisionable server. Bootstrap code 400 is provided to a provisionable server in response to receiving, from the provisionable server, a provisionable server identifier such as provisionable server identifier 332 in FIG. 3. Bootstrap code includes boot parameters 402. Boot parameters 402 are parameters that enable the provisionable server to boot a bootstrap operating system, such as bootstrap operating system 340 in FIG. 3.

Bootstrap code 400 also includes designated operating environment identifier 404. Designated operating environment identifier is a designated operating environment identifier such as designated operating environment identifier 334 in FIG. 3. A provisionable server may then compare designated operating environment identifier 404 with a local operating environment identifier of the provisionable server. The comparison enables the provisionable server to determine whether the provisionable server is hosting a designated operating environment. In addition, if the provisionable server is not hosting the designated operating environment, then the provisionable server is able to locate the designated operating environment in a software server using designated operating environment identifier 404.

Figure 5:
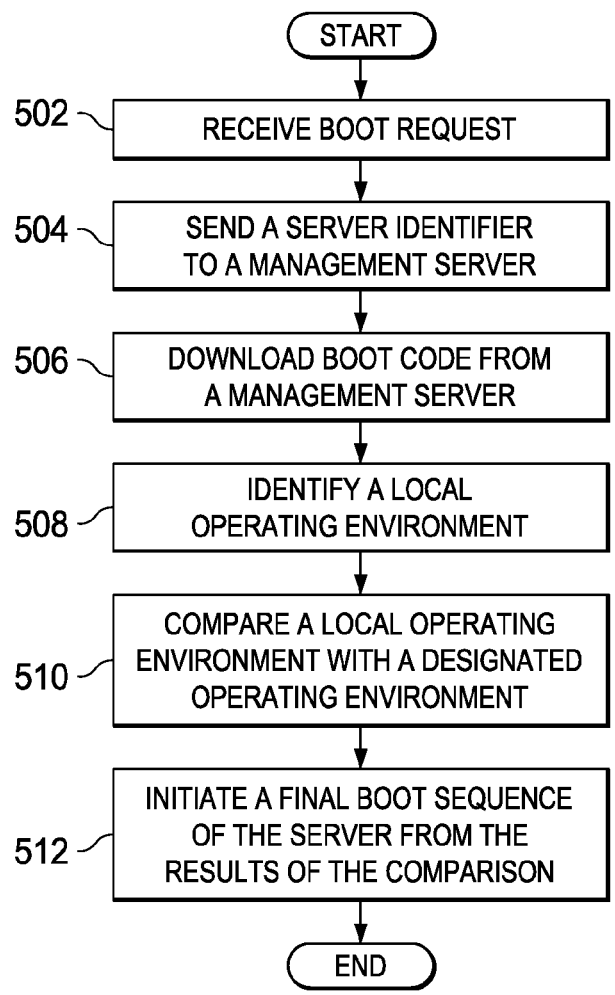
FIG. 5 is a flowchart of the steps of provisioning process according to an illustrative embodiment.

FIG. 5 is a flowchart of the steps of provisioning process according to an illustrative embodiment. The process depicted in FIG. 5 may be implemented by a provisionable server such as provisionable server 304 in FIG. 3.

The process begins by receiving a boot request (step 502). The boot request is a boot request such as boot request 346 in FIG. 3. The process then sends a server identifier to a management server (step 504). Thereafter, the process downloads boot code from a management server (step 506). The boot code is boot code such as boot code 400 in FIG. 4.

The process then identifies a local operating environment (step 508). The process compares the local operating environment with a designated operating environment (step 510). The process then initiates a final boot sequence from results of the comparison (step 512) and terminates.

Figure 6:
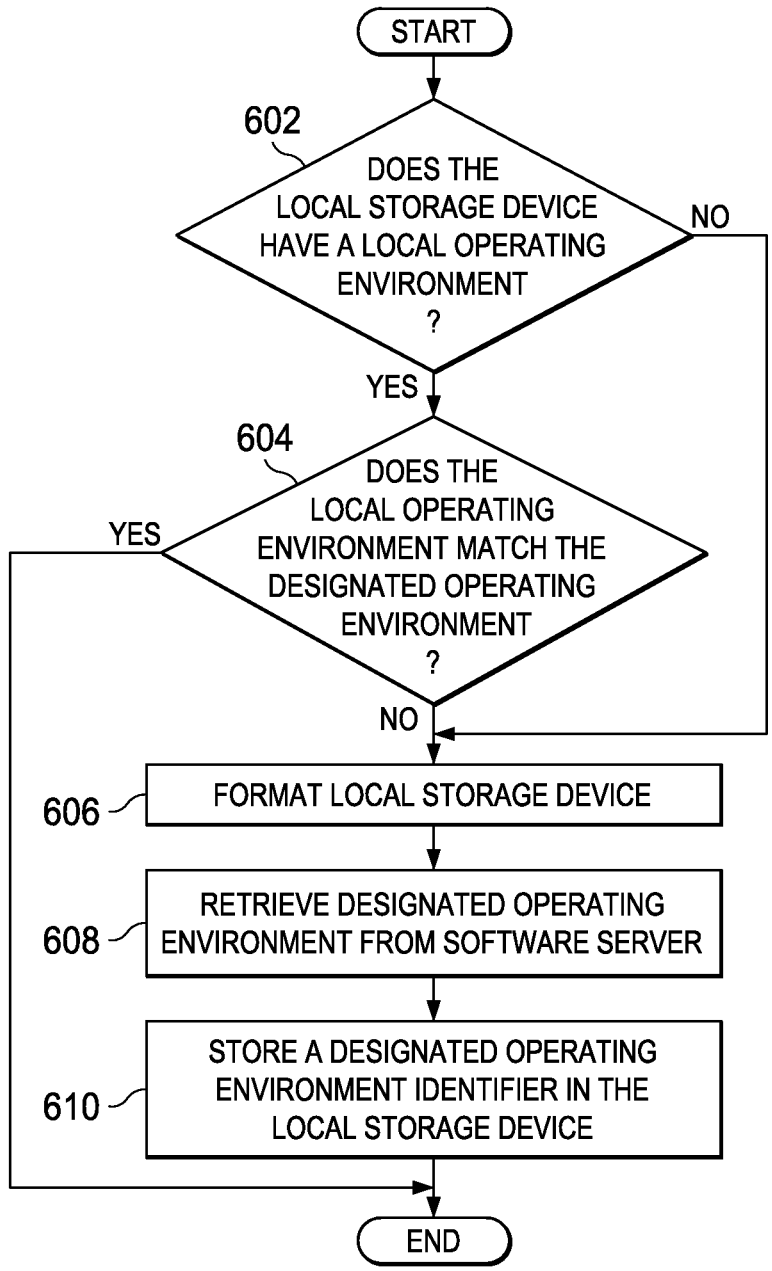
FIG. 6 is a flowchart of a process for comparing a local operating environment and a designated operating environment in accordance with an illustrative embodiment.

FIG. 6 is a flowchart of a process for comparing a local operating environment and a designated operating environment in accordance with an illustrative embodiment. The process depicted in FIG. 6 may be performed by a provisionable server such as provisionable server 304 in FIG. 3.

The process begins by making a determination as to whether the local storage device has a local operating environment (step 602). If the local storage device has a local operating environment, then the process makes the determination as to whether the local operating environment matches the designated operating environment (step 604). In one embodiment, a match between the local operating environment and the designated operating environment may be determined by comparing operating environment identifiers.

If the process makes the determination that the local operating environment matches the designated operating environment, then the process terminates. However, if the process makes the determination that the local operating environment does not match the designated operating environment, the process formats the local storage device (step 606). The process then retrieves the designated operating environment from the software server (step 608). The process is able to identify the designated operating environment using the information provided in the boot code. Thereafter, the process stores a designated operating environment identifier in the local storage device (step 610) and the process terminates.

Returning now to step 602, if the process makes the determination that the local storage device does not have a local operating environment, then the process proceeds to step 606.

Figure 7:
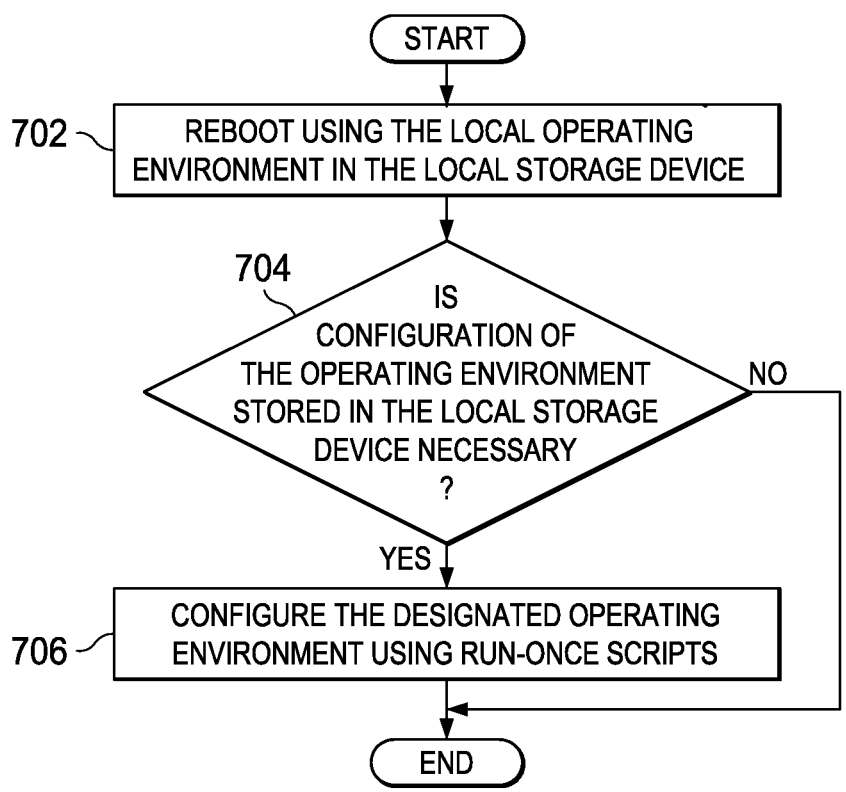
FIG. 7 is a flowchart of a process for a final boot sequence for provisioning a provisionable server in accordance with an illustrative embodiment.

FIG. 7 is a flowchart of a process for a final boot sequence for provisioning a provisionable server in accordance with an illustrative embodiment. The process depicted in FIG. 7 may be implemented by a provisionable server such as provisionable server 304 in FIG. 3.

The process begins by rebooting using the operating environment stored in the local storage device (step 702). The process then makes the determination as to whether configuration of the operating environment stored in the local storage device is necessary (step 704). Configuration of the operating environment stored in the local storage device is necessary if, at step 604 in FIG. 6, the process for comparing the local operating environment and the designated operating environment does not result in a match.

If the process makes the determination that configuration of the operating environment stored in the local storage device is necessary, then the process configures the operating environment stored in the local storage device using run-once scripts (step 706) and the process terminates.

However, if at step 704 the process makes the determination that the configuration of the operating environment stored in the local storage device is not necessary, then the process terminates.

Figure 8:
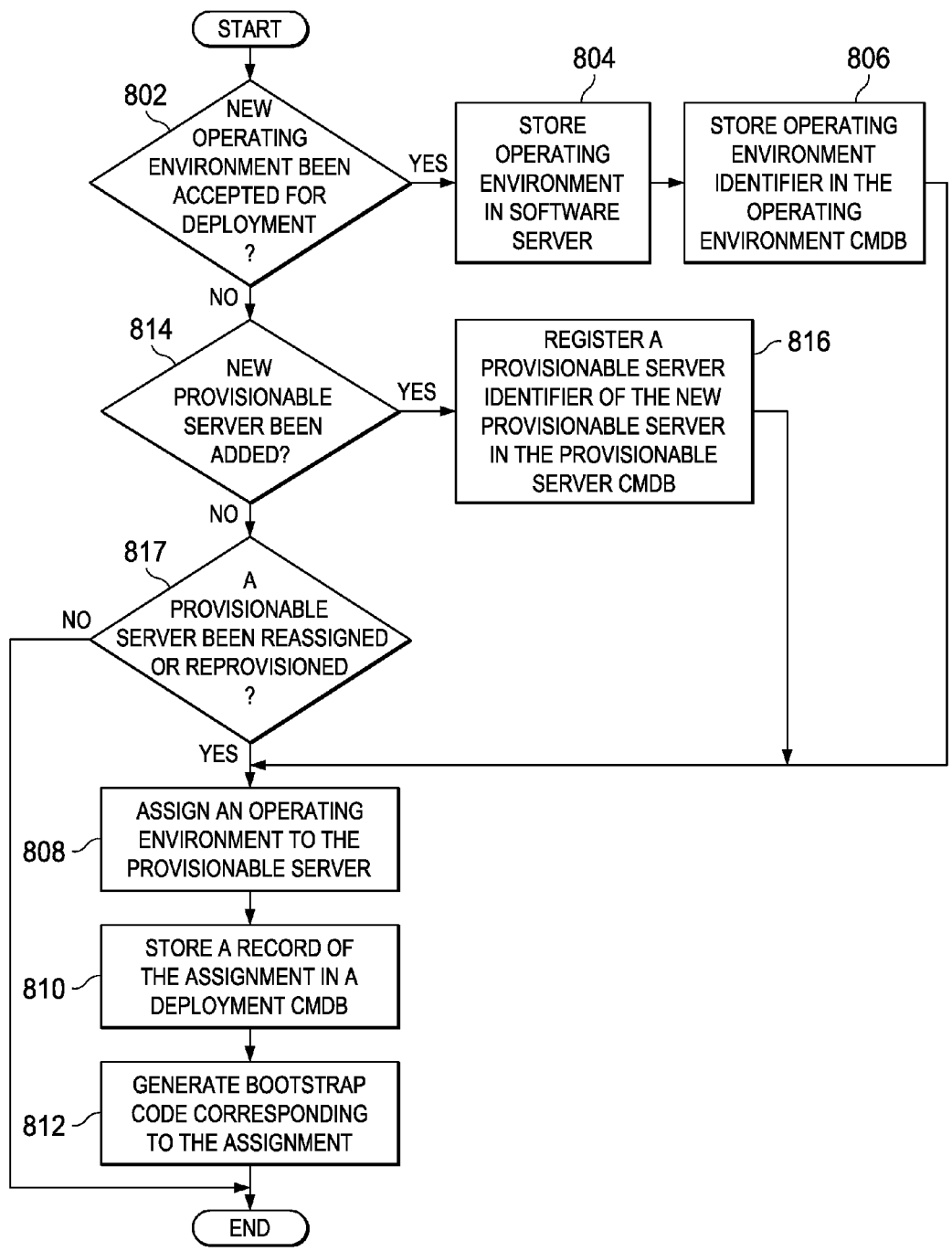
FIG. 8 is a flowchart of a process for deploying operating environments in a network data processing system in accordance with an illustrative embodiment.

FIG. 8 is a flowchart of a process for deploying operating environments in a network data processing system in accordance with an illustrative embodiment. The process depicted in FIG. 8, which may be initiated in response to detecting a provisioning event, is implemented in a server such as management server 310 in FIG. 3. The provisioning event is a provisioning event, such as provisionable event 342 in FIG. 3.

The process begins by making the determination as to whether a new operating environment has been accepted for deployment (step 802). If the process makes the determination that a new operating environment has been accepted for deployment, the process stores the operating environment in a software server (step 804). The software server is a software server, such as software server 306 in FIG. 3.

The process then stores an operating environment identifier associated with the new operating environment in the operating environment configuration management database (step 806). The operating environment identifier is an operating environment identifier such as designated operating environment identifier 334 in FIG. 3. Thereafter, the process assigns an operating environment to the provisionable server (step 808). The assignment may occur automatically according to business logic implemented at a data center housing a set of provisionable servers or the assignment may occur manually by an administrator of the data center.

The process then stores a record of the assignment in a deployment configuration management database (step 810). The process then generates bootstrap code corresponding to the assignment (step 812) and the process terminates. The bootstrap code is bootstrap code such as bootstrap code 338 in FIG. 3.

Returning now to step 802, if the process makes the determination that a new operating environment has not been accepted for deployment, then the process makes the determination as to whether a new provisionable server has been added (step 814). If the process makes the determination that a new provisionable server has been added, then the process registers a provisionable server identifier of the new provisionable server in the provisionable server configuration management database (step 816). The provisionable server identifier is a provisionable server identifier such as provisionable server identifier 332 in FIG. 3. The process then continues to step 808.

If at step 814 the process makes the determination that a new provisionable server has not been added, then the process makes the determination as to whether a provisionable server has been reassigned or reprovisioned (step 817). If the process makes the determination that a provisionable server has been reassigned or reprovisioned, then the process proceeds to step 808. However, if the process makes the determination that a provisionable server has not been reassigned or reprovisioned, then the process terminates.

Thus, the illustrative embodiments disclosed herein provide a computer implemented method, apparatus, and computer program product for provisioning a server in a networked environment. In one embodiment, the process sends a server identifier to a management server in response to receiving a boot command. The management server uses the server identifier for identifying a designated operating environment for the server to form a designated operating environment identifier. The process then receives, from the management server, the designated operating environment identifier and a first bootstrap code. The process uses the first bootstrap code to extract information for identifying a local operating environment on the server. Thereafter, the process compares the local operating environment to the designated operating environment and initiates a final boot sequence of the server based on the comparison of the local operating environment and the designated operating environment.

The illustrative embodiments disclosed herein facilitate the provisioning of operating environments into provisionable servers. In particular, the embodiments disclosed herein enable a provisionable server to determine, at boot time, whether or not the provisionable server is hosting the correct operating environment. In the event that the provisionable server is not hosting the correct operating environment, then the provisionable server may automatically re-provision itself. Such autonomous action obviates the need for user oversight. The automated re-provisioning reduces the introduction of provisioning errors. Thus, the embodiments disclosed herein result in reduced implementation costs.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for deploying an operating environment onto a provisionable server, the computer implemented method comprising:
    responsive to detecting a provisioning event, assigning, by a management server using a provisionable server identifier, a designated operating environment identifier to the provisionable server, from an operating environment configuration management database of a configuration management database server, the configuration management database server further comprising a provisionable server configuration management database and a deployment configuration management database, wherein details of an assignment are embodied in an assignment record comprising information relating to the assignment of the operating environment from a software server to the provisionable server, and wherein the designated operating environment identifier is an identifier that identifies a unique operating environment and discloses a location of the unique operating environment within the software server, and wherein the unique operating environment is a set of software components comprising an operating system, middleware, and one or more software applications selected to satisfy processing requirements of one or more tenants, and wherein each operating environment has a unique name reflecting a type of the operating environment and a version, of the operating environment, representing different versions of a set of software applications that form the operating environment;
    storing only the assignment record in the deployment configuration management database used in managing an assignment of operating environments;
    updating the management server controlling a deployment process for deployment of the operating environments with the designated operating environment identifier of the assignment; and
    generating, by the management server, bootstrap code corresponding to the assignment.

2. The computer implemented method of claim 1, wherein the provisioning event is at least one of acceptance of a new operating environment, an addition of the provisionable server to a data center, and request for reassigning the provisionable server.

3. The computer implemented method of claim 1, further comprising:
    responsive to detecting the provisioning event comprising an acceptance of a new operating environment, assigning a new designated operating environment identifier to the new operating environment;
    storing, in a software server, software for the new operating environment; and
    updating the operating environment configuration management database with the new designated operating environment identifier and a locator for locating the software in the software server.

4. The computer implemented method of claim 1, further comprising:
    responsive to detecting the provisioning event comprising an addition of the provisionable server to a data center, registering a media access control address of the provisionable server in a provisionable server configuration management database.

5. The computer implemented method of claim 1, wherein the provisionable server comprises a set of servers configured to host a set of operating environments; and
    a set of software servers stores software required for provisioning operating environments onto the provisionable server.

6. The computer implemented method of claim 1, further comprising:
    generating bootstrap code, corresponding to the assignment, usable by the provisionable server to initiate the provisioning of the operating environment onto the provisionable server, wherein the bootstrap code includes the designated operating environment identifier.

7. The computer implemented method of claim 1, wherein the management server transmits the designated operating environment identifier along with a bootstrap code to the provisionable server, wherein the bootstrap code is executed on the provisionable server to identify a local operating environment on the provisionable server, and further comprising:

comparing the identified local operating environment to the designated operating environment identifier, wherein the bootstrap code includes the designated operating environment identifier; and initiating a final boot sequence of the provisionable server based on a comparison of the identified local operating environment and the designated operating environment identifier.

8. A computer program product for deploying an operating environment onto a provisionable server, the computer program product comprising:

a computer recordable storage device;

program code, stored on the computer recordable storage device, for assigning, by a management server using a provisionable server identifier, a designated operating environment identifier to the provisionable server from an operating environment configuration management database of a configuration management database server, the configuration management database server further comprising a provisionable server configuration management database and a deployment configuration management database, wherein details of an assignment are embodied in an assignment record comprising information relating to the assignment of the operating environment from a software server to the provisionable server, and wherein the designated operating environment identifier is an identifier that identifies a unique operating environment and discloses a location of the unique operating environment within the software server, and wherein the unique operating environment is a set of software components comprising an operating system, middleware, and one or more software applications selected to satisfy processing requirements of one or more tenants in response to detecting a provisioning event, and wherein each operating environment has a unique name reflecting a type of the operating environment and a version, of the operating environment, representing different versions of a set of software applications that form the operating environment;

program code, stored on the computer recordable storage device, for storing only the assignment record in the deployment configuration management database;

program code, stored on the computer recordable storage device, for updating the management server controlling a deployment process for deployment of the operating environments with the designated operating environment identifier of the assignment; and program code, stored on the computer recordable storage device, for generating, by the management server, bootstrap code corresponding to the assignment.

9. The computer program product of claim 8, wherein the provisioning event is at least one of acceptance of a new operating environment, an addition of the provisionable server to a data center, and request for reassigning the provisionable server.

10. The computer program product of claim 8, further comprising:

program code, stored on the computer recordable storage device, for assigning a new designated operating environment identifier to a new operating environment in response to detecting the provisioning event comprising an acceptance of the new operating environment;

program code, stored on the computer recordable storage device, for storing, in a software server, software for the new operating environment; and program code, stored on the computer recordable storage device, for updating the operating environment configuration management database with the new designated operating environment identifier and a locator for locating the software in the software server.

11. The computer program product of claim 8, further comprising:

program code, stored on the computer recordable storage device, for registering a media access control address of the provisionable server in a provisionable server configuration management database in response to detecting the provisioning event comprising an addition of the provisionable server to a data center.

12. The computer program product of claim 8, wherein the provisionable server comprises a set of servers configured to host a set of operating environments; and a set of software servers stores software required for provisioning operating environments onto the provisionable server.

13. The computer program product of claim 8, further comprising:

program code, stored on the computer recordable storage device, for generating bootstrap code corresponding to the assignment usable by the provisionable server to initiate the provisioning of the operating environment onto the provisionable server, wherein the bootstrap code includes the designated operating environment identifier.

14. The computer program product of claim 8, wherein the management server transmits the designated operating environment identifier along with a bootstrap code to the provisionable server, wherein the bootstrap code is executed on the provisionable server to identify a local operating environment on the provisionable server, and further comprising:

program code, stored on the computer recordable storage device, for comparing the identified local operating environment to the designated operating environment identifier, wherein the bootstrap code includes the designated operating environment identifier; and program code, stored on the computer recordable storage device, for initiating a final boot sequence of the provisionable server based on a comparison of the identified local operating environment and the designated operating environment identifier.

15. An apparatus for deploying an operating environment onto a provisionable server, the apparatus comprising:

a bus system;

a memory connected to the bus system, wherein the memory includes computer usable program code; and a processing unit connected to the bus system, wherein the processing unit executes the computer usable program code to assign, by a management server using a provisionable server identifier, a designated operating environment identifier to the provisionable server from an operating environment configuration management database of a configuration management database server, the configuration management database server further comprising a provisionable server configuration management database and a deployment configuration management database, wherein details of an assignment are embodied in an assignment record comprising information relating to the assignment of the operating environment from a software server to the provisionable server, and wherein the designated operating environment identifier is an identifier that identifies a unique operating environment and discloses a location of the unique operating environment within the software server, and wherein the unique operating environment is a set of software components comprising an operating system, middleware, and one or more software applications selected to satisfy processing requirements of one or more tenants, and wherein each operating environment has a unique name reflecting a type of the operating environment and a version, of the operating environment, representing different versions of a set of software applications that form the operating environment, in response to detecting a provisioning event; store only the assignment record in the deployment configuration management database used in managing an assignment of operating environments; update the management server controlling a deployment process for deployment of the operating environment with the designated operating environment identifier of the assignment; and generate, by the management server, bootstrap code corresponding to the assignment.

16. The apparatus of claim 15, wherein the provisioning event is at least one of acceptance of a new operating environment, an addition of the provisionable server to a data center, and request for reassigning the provisionable server.

17. The apparatus of claim 15, wherein the processing unit further executes the computer usable program code to detect the provisioning event comprising an acceptance of a new operating environment, assigning a new designated operating environment identifier to the new operating environment; store, in a software server, software for the new operating environment; and update the operating environment configuration management database with the new designated operating environment identifier and a locator for locating the software in the software server.

18. The apparatus of claim 15, wherein the processing unit further executes the computer usable program code to reboot the provisionable server using a local operating environment stored on a local storage device in response to detecting a match between the designated operating environment identifier and an identity of the local operating environment; and reboot the provisionable server using a designated operating environment, corresponding to the designated operating environment identifier, stored in the local storage device in response to detecting a difference between the designated operating environment identifier and the local operating environment, wherein the processing unit further configures the designated operating environment using run-once scripts.

19. The apparatus of claim 15, wherein the processing unit further executes the computer usable code to register a media access control address of the provisionable server in a provisionable server configuration management database in response to detecting the provisioning event comprising an addition of the provisionable server to a data center.

20. The apparatus of claim 15, wherein the management server transmits the designated operating environment identifier along with a bootstrap code to the provisionable server, and wherein the bootstrap code is executed on the provisionable server to identify a local operating environment on the provisionable server, and wherein the processing unit further executes the computer usable program code to compare the identified local operating environment to the designated operating environment identifier, and wherein the bootstrap code includes the designated operating environment identifier; and initiates a final boot sequence of the provisionable server based on a comparison of the identified local operating environment and the designated operating environment identifier.

* * * * *